United States Patent [19]

Moricca et al.

[11] 4,028,502
[45] June 7, 1977

[54] APPARATUS FOR ADAPTING MULTI-LINE TELEPHONE INSTRUMENT FOR USE BY THE BLIND

[75] Inventors: Larry S. Moricca, Churubusco; Gregory A. Zaker, Fort Wayne, both of Ind.

[73] Assignee: Inventive Industries, Inc., Houston, Tex.

[22] Filed: Feb. 13, 1976

[21] Appl. No.: 657,719

[52] U.S. Cl. .............................. 179/99; 179/81 C; 179/84 L; 340/407
[51] Int. Cl.² ........................................ H04M 1/72
[58] Field of Search ............ 179/2 A, 84 L, 28, 36, 179/2 R, 27 FB, 27 FC, 51 R, 53, 90 K, 90 L, 91 R, 91 A, 94, 99, 1 B, 81 C; 340/365 P, 407; 35/35 A; 200/312, 314, 331, 340

[56] References Cited
UNITED STATES PATENTS

| 3,057,965 | 10/1962 | Banks et al. | 179/91 R |
| 3,234,337 | 2/1966 | Schuyler | 179/91 R |
| 3,250,023 | 5/1966 | Benson | 340/407 |
| 3,585,303 | 6/1971 | Chieffo | 179/84 L |
| 3,665,111 | 5/1972 | Schieser | 179/81 C |
| 3,740,446 | 6/1973 | Benson | 35/35 A |

OTHER PUBLICATIONS

"Sensicall", Bell Telephone Magazine, Winter 1965, p. 57.
"Bell System Aid to the Blind", Bell Labs Record, Jan. 1957, pp. 30 & 31.
"Switchboards for the Blind", Bell Labs Record, vol. 31, No. 6, June 1953, p. 220.
"Phones for the Deaf and Blind", Bell Telephone Magazine, vol. 50, No. 1, Jan/Feb. 1971.

*Primary Examiner*—Kathleen H. Claffy
*Assistant Examiner*—Randall P. Myers
*Attorney, Agent, or Firm*—Gust, Irish, Jeffers & Rickert

[57] ABSTRACT

Apparatus for providing auditory and tactile recognition of a light signal associated with a line-selector pushbutton of a multi-line telephone instrument. A photocell is provided for sensing the light signal. An oscillator generates a sine wave voltage which is amplified and applied to excite a piezoelectric crystal into vibration in response to activation of the photocell. An auxiliary pushbutton is disposed in alignment with the line selector pushbutton so that manual depression of the auxiliary pushbutton actuates the line selector pushbutton. Vibration of the crystal in response to the light signal acts upon the auxiliary pushbutton to impart the vibration thereto so that the presence of a light signal is sensed by vibration of the auxiliary pushbutton.

15 Claims, 8 Drawing Figures

APPARATUS FOR ADAPTING MULTI-LINE TELEPHONE INSTRUMENT FOR USE BY THE BLIND

BACKGROUND OF THE INVENTION

1. Field of the Invention

This invention relates to apparatus for adapting a multi-line telephone instrument for use by the blind.

2. Description of the Prior Art

A conventional multi-line telephone instrument having a plurality of line selector pushbuttons, each having a light source associated therewith for visually indicating an incoming call on a particular line or that a particular line is in use, presents a problem to a blind person who has no way of determining which line has an incoming call thereon or whether a particular line is in use. The blind person upon hearing the audible signal indicating an incoming call thus must actuate a number of pushbuttons until the appropriate line is found, possibly interrupting a call on another line in the process. Likewise, the blind person may interrupt a call on one line while actuating the pushbuttons to find an open line for making an outgoing call. To the best of the present applicant's knowledge and belief, no apparatus has been provided for readily and inexpensively adapting a conventional multi-line telephone instrument for use by the blind which does not require modification of the instrument itself.

SUMMARY OF THE INVENTION

In its broader aspects, the apparatus of the invention provides auditory and/or tactile recognition of a light signal associated with a line selector pushbutton of a multi-line telephone instrument. Means are provided for sensing the light signal, and means are provided coupled to the sensing means and responsive thereto for generating a mechanical vibration in a part of the instrument, the vibration being at a frequency capable of auditory and/or tactile recognition.

It is accordingly an object of the invention to provide apparatus for providing auditory or tactile recognition of a light signal associated with a line selector pushbutton of a multi-line telephone instrument.

Another object of the invention is to provide apparatus for adapting a multi-line telephone instrument for use by the blind.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
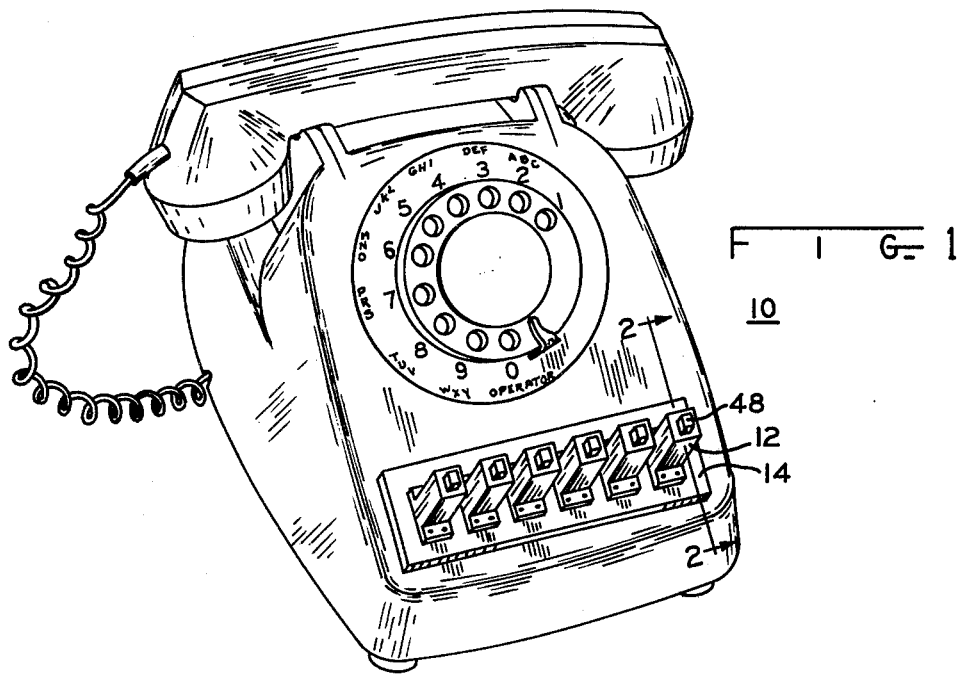
FIG. 1 is a view in perspective showing a conventional multi-line telephone instrument equipped with the apparatus of the invention.
Figure 2:
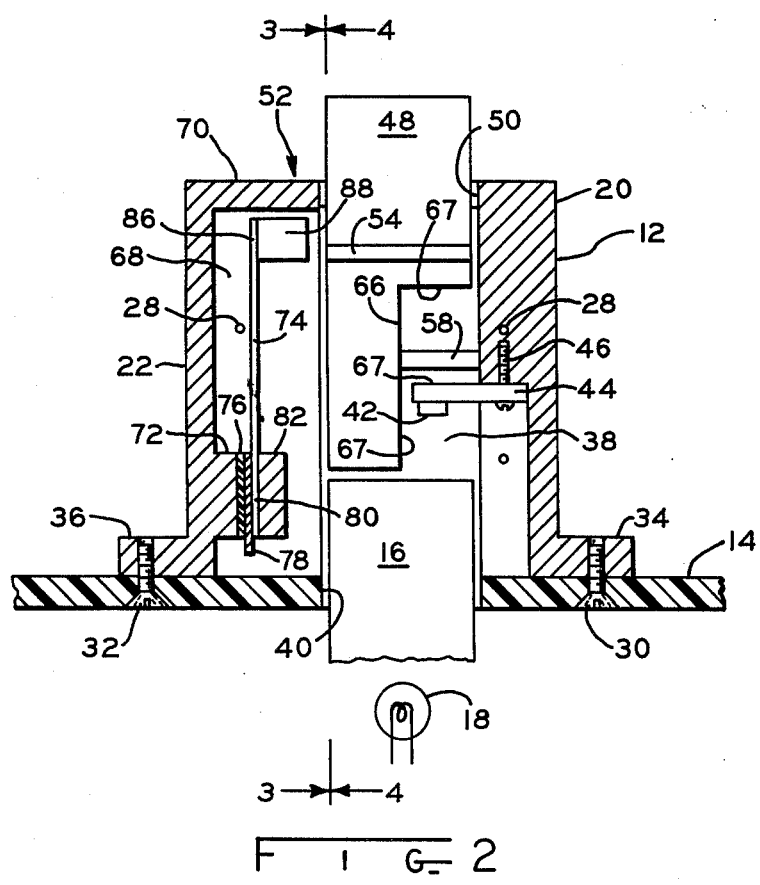
FIG. 2 is a cross-sectional view of the apparatus of the invention associated with one line selector pushbutton of the telephone instrument of FIG. 1 and taken generally along the line 2—2 thereof.
Figure 3:
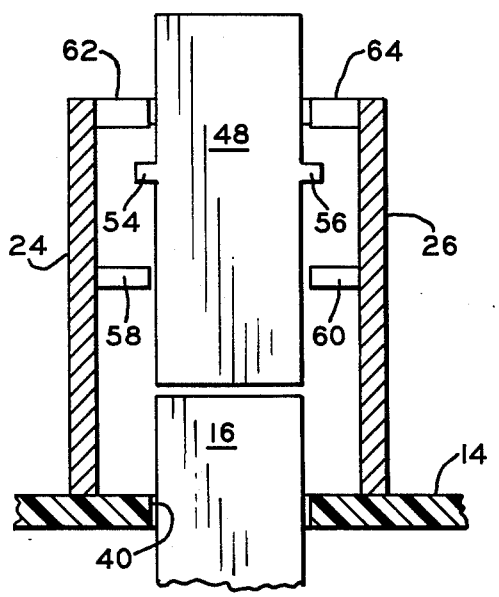
FIG. 3 is a cross-sectional view taken generally along the line 3—3 of FIG. 2.
Figure 4:
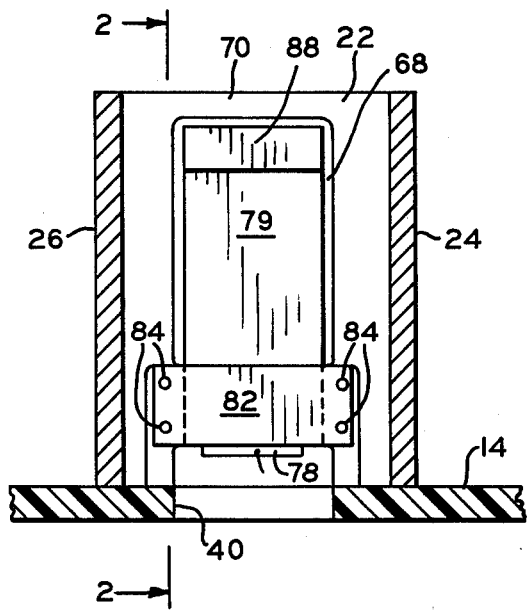
FIG. 4 is a cross-sectional view taken generally along the line 4—4 of FIG. 2.
Figure 5:
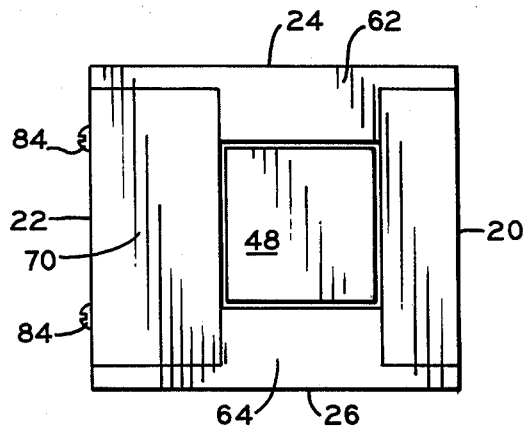
FIG. 5 is a top view of the apparatus of FIG. 2.

Referring to FIG. 1 of the drawings, there is shown, generally indicated at 10, a conventional multi-line telephone instrument of the type having a plurality of line-selecting pushbuttons each having an indicator lamp associated therewith which is illuminated in response to an incoming call on the respective line and/or a respective line being in use. In accordance with the invention, an adapter assembly 12 mounted on trim plate 14 is associated with each pushbutton 16 (FIG. 2). In this embodiment, instrument 10 is of the type having transparent pushbuttons 16 respectively having indicator lamps 18 positioned thereberneath, energization of a lamp resulting in illumination of the respective pushbutton.

Referring now additionally to FIGS. 2 through 7, each adapter 12 comprises end plates 20, 22 and side plates 24, 26 held in assembled relation by threaded fasteners 28. Adapter 12 is secured to trim plate 14 by means of threaded fasteners 30, 32 engaging flanges 34, 36 on end plates 20, 22.

End plates 20, 22 and side plates 24, 26 define cavity 38 which receives pushbutton 16. Pushbutton 16 extends upwardly through opening 40 in trim plate 14. Conventional photo cell 42 is supported in cavity 38 by bracket 44 secured to end plate 20 by threaded fastener 46. Photo cell 42 is exposed to pushbutton 16 and receives light therefrom in response to illumination of lamp 18.

Auxiliary pushbutton 48 is positioned in cavity 38 in alignment with pushbutton 16, extends upwardly through opening 50 in top 52 of adapter 12, and is guided for vertical movement by end plates 20, 22 and side plates 24, 26 so that manual depression of auxiliary pushbutton 48 results in actuation of pushbutton 16. The travel of auxiliary pushbutton 48 is limited by engagement of ears 54, 56 thereon with ears 58, 60 and top flanges 62, 64 on side plates 24, 26. Cut-out portion 66 in auxiliary pushbutton 48 accommodates photo cell 42 and bracket 44.

End plate 22 has cavity 68 formed therein which extends between top flange 70 and crystal mounting portion 72. Elongated, reed-like piezoelectric crystal 74 is provided disposed in cavity 68 generally parallel with auxiliary pushbutton 48. A thin layer of insulation 76 is applied on the surface of mounting portion 72. Electrode 78 is clamped against insulative layer 76 by end 80 of crystal 74 which, in turn, is clamped by clamp member 82 engaged by threaded fasteners 84. Distal end 86 of crystal 74 is thus free to vibrate in response to an alternating current applied across electrode 78 and clamp 82 which is at ground potential.

Bumper end 88 is secured to distal end 86 of crystal 74 by suitable adhesive and imparts the vibration of crystal 74 to auxiliary pushbutton 48.

Figure 7:
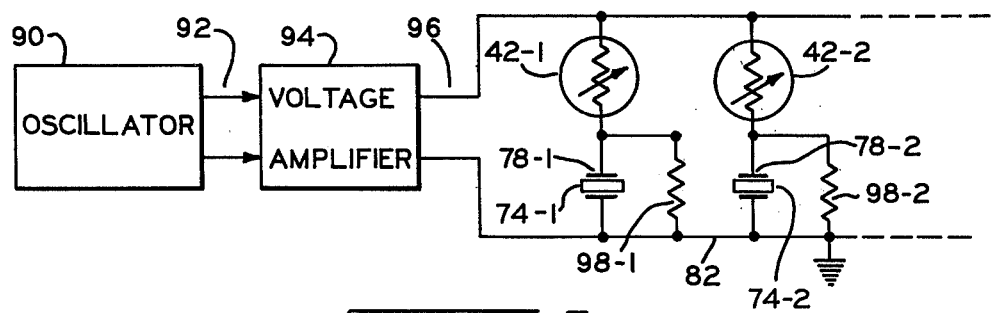
FIG. 7 is a schematic view of the electrical circuit of the apparatus of the invention.

Referring now particularly to FIG. 7, oscillator 90 provides a substantially sine wave voltage in its output circuit 92 coupled to the input circuit of voltage amplifier 94. Photo cells 42-1 and 42-n and crystals 74-1 to 74-n are respectively series-connected across output circuit 96 of voltage amplifier 94. Resistors 98-1 to 98-n are respectively connected across crystals 74 and are proportioned so that crystals 74 provide no output vibration when the respective photo cell 42 is in the dark or "off" condition. In a specific embodiment of the invention, oscillator 90 provides a substantially sine wave output voltage having a frequency in the range of about 600 to 800 hertz, and the output voltage of amplifier 94 is in the range of about 40 to 120 volts (peak to peak). Photo cells 42 were Vactec No. VT 913 and crystals 74 were Vernitron 5H 0.875 × 0.25 × 0.021 inch. In that embodiment, the vibratory output was more than ample and easily identified by audition or finger engagement with a particular auxiliary pushbutton 48.

In order to reduce the amount of stray light reaching photo cell 42, surfaces 67 on bracket 44 and auxiliary pushbutton 48 may be painted black. With this arrangement, the "off" resistance of photocells 42 was about 250 K under normal room lighting while the "on" resistance in response to illumination of the respective lamp 18 was about 4K.

Figure 8:
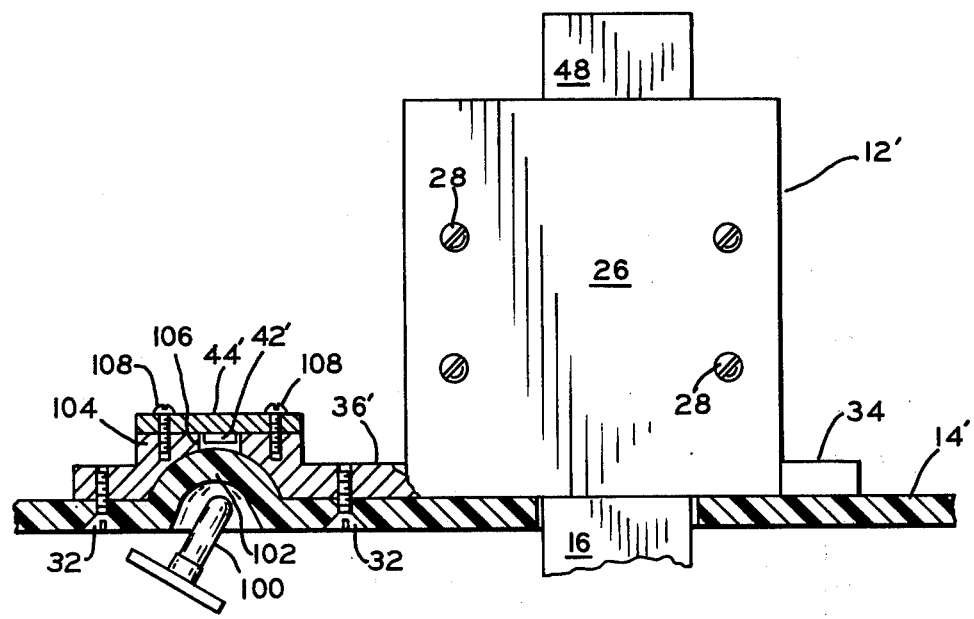
FIG. 8 is a side view, partially in cross section, illustrating a modification of the apparatus of the invention for use with telephone instruments using light emitting diodes for the line indicators.
Figure 6:
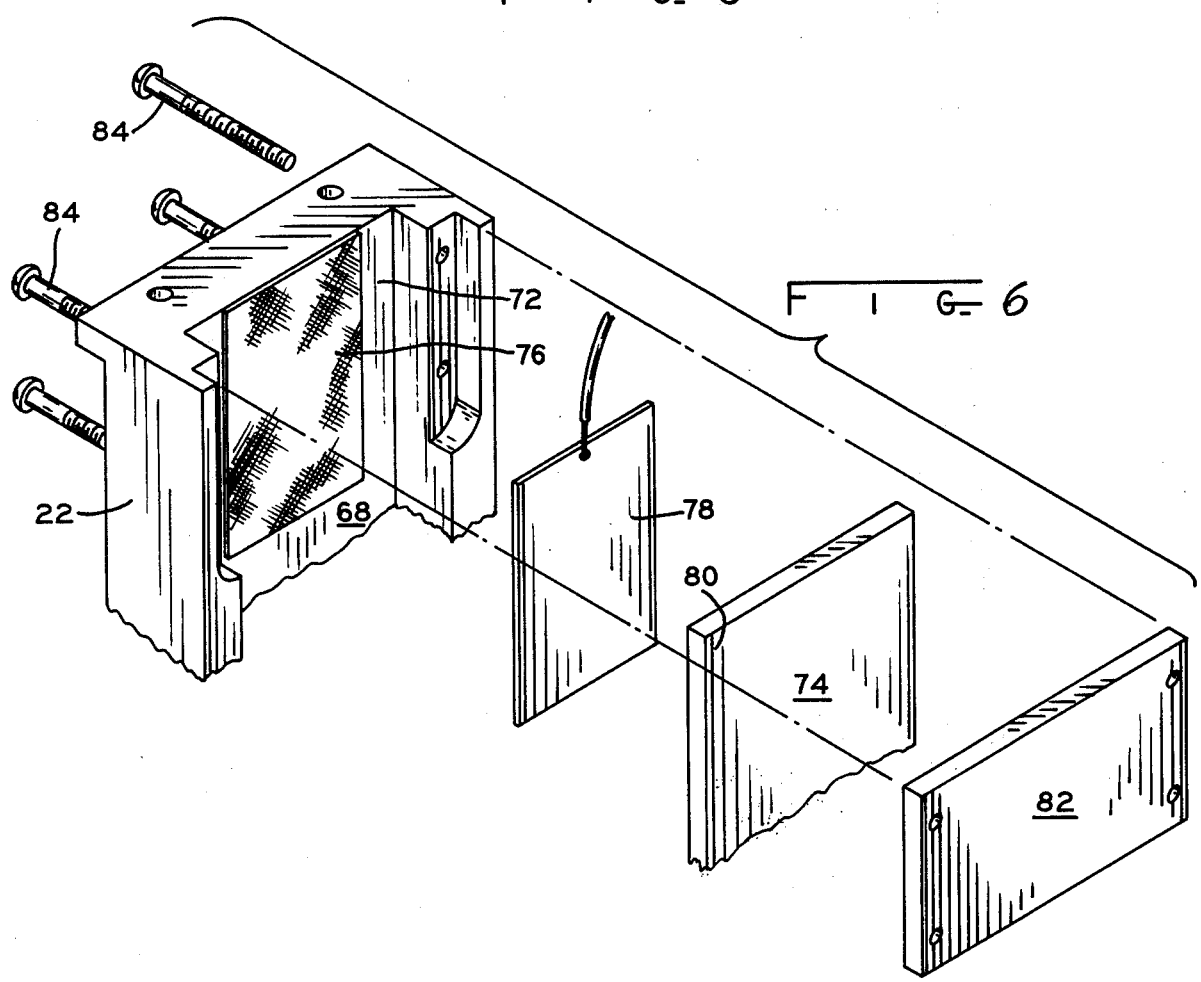
FIG. 6 is a fragmentary, bottom exploded view of the apparatus of FIG. 2.

Referring now to FIG. 8, in which like elements are indicated by like reference numerals and similar elements by primed reference numerals, apparatus 12' is adapted for use with telephone instruments of the type employing light emitting diodes 100 as indicated, LED's 100 being spaced from pushbuttons 16, as shown. Here, trim plate 14' has elongated, transparent window section 102 through which LED's 100 are normally viewed. In this embodiment, flange 36' has portion 104 which embraces window portion 102. Openings 106 are formed in portion 104 respectively aligned with LED's 100. Photo cells 42' carried by mounting plates 44' are positioned in openings 106 respectively to receive light from LED's 100, mounting plates 44' being secured to portion 104 of flange 36' by suitable threaded fasteners 108. The construction and mode of operation of apparatus 12' of FIG. 8 is otherwise substantially the same as that described above in connection with FIGS. 2–7.

It will now be seen that in accordance with the invention, an auxiliary pushbutton associated with each line-selecting push-button of a multi-line telephone instrument is vibrated in response to illumination of the respective indicating lamp, the vibration being of such amplitude and frequency to permit auditory recognition or tactile recognition by finger-engagement with the auxiliary pushbutton. The correct identification of the active button is insured by the operator's touch; i.e., when the button is gently pressed and held away from the piezoelectric vibrator, the button loses contact with the vibrator and the tactual and auditory signal is greatly reduced. Thus, a blind person can recognize a line having an incoming call and/or a line in use. It will further be seen that the apparatus of the invention can be installed on existing telephone instruments without modification of the instrument beyond providing a new trim plate 14 or drilling holes in existing trim plate to accommodate threaded fasteners 30. In some instances, telephone instruments have "HOLD" buttons included with the others which is unlighted: no auxiliary pushbutton device would need to be used with such "HOLD" buttons.

While there have been described above the principles of this invention in connection with specific apparatus, it is to be clearly understood that this description is made only by way of example and not as a limitation to the scope of the invention.

What is claimed is:

1. Apparatus for providing vibratory recognition of a light signal associated with a line-selector pushbutton of a multi-line telephone instrument comprising means for sensing said light signal, means coupled to said sensing means and responsive thereto for generating a mechanical vibration, said vibration being at a frequency capable of discernible vibratory recognition, and a member associated with the pushbutton and adapted for finger engagement and acted upon by said generating means so that said vibration is imparted thereto for discernible vibratory recognition of the light signal associated with said pushbutton.

2. The apparatus of claim 1 wherein said member is an auxiliary pushbutton, and further comprising means for mounting said auxiliary pushbutton in alignment with said line-selector pushbutton so that manual depression of said auxiliary pushbutton actuates said line-selector pushbutton.

3. The apparatus of claim 2 wherein said generating means comprises a piezoelectric crystal and a signal generator coupled in signal transmitting relation to said crystal for exciting the same in response to signal transmission thereto, said crystal acting upon said auxiliary pushbutton.

4. The apparatus of claim 3 wherein said sensing means is a photocell coupled in circuit with said signal generator and crystal.

5. The apparatus of claim 4 wherein said light signal is provided by a light source, said line-selector pushbutton being light transmissive and disposed to receive said light signal from said source, said photocell being disposed to receive light from said line-selector pushbutton.

6. The apparatus of claim 4 wherein said signal generator produces a substantially sine wave voltage and further comprising a voltage amplifier having its input coupled to said signal generator, said photocell and crystal being series-connected across the output of said amplifier, and a resistor coupled across said crystal and having a resistance such that said crystal provides no vibratory output when said photocell is in the "off" condition.

7. The apparatus of claim 6 wherein said voltage has a frequency of about 600 to 800 hertz.

8. The apparatus of claim 3 wherein said piezoelectric crystal is elongated, and further comprising means for mounting one end of said crystal whereby the distal end is free to vibrate in response to said signal generator, said crystal extending generally parallel with said auxiliary pushbutton, and means on said distal end of said crystal for impacting said auxiliary pushbutton in response to vibration of said crystal.

9. The apparatus of claim 8 wherein said crystal mounting means includes electrodes respectively engaging opposite sides of said crystal.

10. The apparatus of claim 4 wherein said light signal is provided by a light source spaced from said line-selector pushbutton, and further comprising means for mounting said photocell to receive light from said source.

11. Apparatus for adapting a multi-line telephone instrument having a plurality of line-selector pushbuttons and associated indicator lights for use by the blind comprising, for each said line-selector pushbutton, an auxiliary pushbutton, means for mounting said auxiliary pushbutton in alignment with the line-selector pushbutton whereby manual depression of said auxiliary pushbutton actuates said line-selector pushbutton, light-sensitive means for sensing illumination of the respective indicator light, means for generating an alternating current signal in response to said light-sensitive means, and means for vibrating said auxiliary pushbutton in response to said signal thereby to provide a vibratory discernible recognition of illumination of the respective indicator light.

12. The apparatus of claim 11 wherein said light-sensitive means is a photocell and said vibrating means is a piezoelectric crystal.

13. The apparatus of claim 12 wherein said photocell applies the output voltage of said generating means across a part of said crystal thereby to excite the same into vibration.

14. Apparatus for providing vibratory recognition of a light signal associated with a line-selector pushbutton of a multi-line telephone instrument comprising first means coupled in relatively fixed relation to a pushbutton for sensing said light signal, and second means coupled in relatively fixed relation to said first means and responsive thereto for generating a mechanical vibration, said vibration being at a frequency capable of discernible vibratory recognition.

15. The apparatus of claim 14, wherein, said first means is coupled in relatively fixed relation to each of a plurality of pushbuttons.

* * * * *